(12) United States Patent
He et al.

(10) Patent No.: US 9,415,384 B2
(45) Date of Patent: Aug. 16, 2016

(54) RESID HYDROTREATING CATALYST CONTAINING TITANIA

(71) Applicant: Advanced Refining Technologies LLC, Columbia, MD (US)

(72) Inventors: Rong He, Palo Alto, CA (US); Stanislaw Plecha, Columbia, MD (US); Meenakshi S. Krishnamoorthy, Columbia, MD (US); Bharat M. Patel, Catonsville, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

(21) Appl. No.: 14/409,560

(22) PCT Filed: Jun. 20, 2013

(86) PCT No.: PCT/US2013/046753
§ 371 (c)(1),
(2) Date: Dec. 19, 2014

(87) PCT Pub. No.: WO2013/192394
PCT Pub. Date: Dec. 27, 2013

(65) Prior Publication Data
US 2015/0144532 A1 May 28, 2015

Related U.S. Application Data

(60) Provisional application No. 61/662,003, filed on Jun. 20, 2012.

(51) Int. Cl.
| | |
|---|---|
| B01J 37/16 | (2006.01) |
| B01J 21/04 | (2006.01) |
| B01J 37/03 | (2006.01) |
| B01J 37/28 | (2006.01) |
| B01J 21/06 | (2006.01) |
| B01J 23/755 | (2006.01) |
| B01J 23/883 | (2006.01) |
| B01J 35/10 | (2006.01) |
| B01J 37/00 | (2006.01) |
| C10G 45/08 | (2006.01) |
| B01J 27/19 | (2006.01) |
| B01J 37/12 | (2006.01) |
| C10G 45/00 | (2006.01) |

(52) U.S. Cl.
CPC *B01J 37/16* (2013.01); *B01J 21/04* (2013.01); *B01J 21/063* (2013.01); *B01J 23/755* (2013.01); *B01J 23/883* (2013.01); *B01J 27/19* (2013.01); *B01J 35/1019* (2013.01); *B01J 35/1042* (2013.01); *B01J 35/1047* (2013.01); *B01J 35/1071* (2013.01); *B01J 35/1076* (2013.01); *B01J 37/0009* (2013.01); *B01J 37/0045* (2013.01); *B01J 37/03* (2013.01); *B01J 37/12* (2013.01); *B01J 37/28* (2013.01); *C10G 45/00* (2013.01); *C10G 45/08* (2013.01); *C10G 2300/107* (2013.01); *C10G 2300/1077* (2013.01); *C10G 2300/70* (2013.01); *C10G 2300/708* (2013.01)

(58) Field of Classification Search
None
See application file for complete search history.

(56) References Cited

U.S. PATENT DOCUMENTS

| | | |
|---|---|---|
| 3,401,125 A | 9/1968 | Jaffee |
| 3,956,105 A | 5/1976 | Conway |
| 4,066,574 A | 1/1978 | Tamm |
| 4,113,661 A | 9/1978 | Tamm |
| 4,154,812 A | 5/1979 | Sanchez et al. |
| 4,179,408 A | 12/1979 | Sanchez et al. |
| 4,270,779 A | 6/1981 | Watts |
| 4,341,625 A | 7/1982 | Tamm |
| 4,440,631 A * | 4/1984 | Togari et al. ............... 208/112 |
| 4,465,790 A | 8/1984 | Quayle |
| 4,568,657 A | 2/1986 | Sepulveda et al. |
| 4,976,848 A | 12/1990 | Johnson |
| 5,089,463 A | 2/1992 | Johnson |
| 5,435,908 A | 7/1995 | Nelson et al. |
| 5,888,380 A | 3/1999 | Fujita et al. |
| 6,036,847 A | 3/2000 | Ziebarth et al. |

(Continued)

FOREIGN PATENT DOCUMENTS

| | | |
|---|---|---|
| CN | 1050736 A | 4/1991 |
| CN | 101890382 A | 11/2010 |

(Continued)

OTHER PUBLICATIONS

Santes et al, catalytic hydrotreating of heavy gasoil FCC feed on alumiina- titania supported NiMo catalyst, 2005, applied catalysis A: General pp. 121-128.*
English translation JP02014818.*
International Search Report and Written Opinion for Application No. PCT/US13/46753 dated Nov. 14, 2013.
Brunauer et al., "Adsorption of gases in multimolecular layers", Emmett and Teller in J. Am. Chem. Soc. 60 (1938) 309-319.

(Continued)

*Primary Examiner* — Melvin C Mayes
*Assistant Examiner* — Stefanie Cohen
(74) *Attorney, Agent, or Firm* — Lerner, David, Littenberg, Krumholz & Mentlik, LLP

(57) ABSTRACT

Improved catalyst supports, supported catalyst, and method of preparing and using the catalysts for the hydrodesulfurization of a residuum hydrocarbon feedstock are disclosed. The catalyst supports comprise titania alumina having 5 wt % or less titania and have greater than 70% of their pore volume in pores having a diameter between 70 and 130 and less than 2% in pores having a diameter above 1000. Catalysts prepared from the supports contain Groups 6, 9 and 10 metals or metal compounds, and optionally phosphorus, supported on the titania alumina supports. Catalysts in accordance with the invention exhibit improved sulfur and MCR conversion in hydrotreating processes.

15 Claims, No Drawings

(56) References Cited

U.S. PATENT DOCUMENTS

| | | | |
|---|---|---|---|
| 6,383,975 | B1 | 5/2002 | Rocha et al. |
| 2005/0234137 | A1 | 10/2005 | Espinoza et al. |
| 2006/0025608 | A1 | 2/2006 | Hutchenson et al. |
| 2010/0279854 | A1 | 11/2010 | Kuperman et al. |
| 2011/0218097 | A1* | 9/2011 | Rayo Mayoral et al. ..... 502/150 |

FOREIGN PATENT DOCUMENTS

| | | | |
|---|---|---|---|
| CN | 102197115 A | | 9/2011 |
| EP | 0339640 A1 | | 11/1989 |
| GB | 1569525 A | | 6/1980 |
| GB | 2121699 A | | 1/1984 |
| JP | 02014818 A | * | 1/1990 |
| WO | 2010033487 A2 | | 3/2010 |

OTHER PUBLICATIONS

International Search Report for Application No. PCT/US2013/026108 dated Apr. 26, 2013.

International Search Report for Application No. PCT/US2013/026323 dated Apr. 26, 2013.

S.K. Maity et al.: "Alumina-titania binary mixed oxide used as support for hydrotreating of Maya heavy crude", Applied Catalysis A: General, vol. 244, (2003), No. 30, pp. 141-153.

Wenyuan Ye et al., Comparison of hydrodesulfurization schemes for residue feedstock with high contents of sulfur, metal and carbon residue, Petroleum Processing and Petrochemicals, Jun. 30, 1995, vol. 26, No. 6, pp. 26-31 (English translation of Abstract provided.)

Fuqiang Deng et al., Application of ultra-fine supported Ni-Mo/Al2O3 catalyst in residue hydrocracking, Petroleum Refinery Engineering, May 31, 2010, pp. 47-50 (English translation of Abstract provided.).

* cited by examiner

RESID HYDROTREATING CATALYST CONTAINING TITANIA

CROSS-REFERENCE TO RELATED APPLICATIONS

The present application is a national phase entry under 35 U.S.C. §371 of International Application No. PCT/US2013/046753 filed Jun. 20, 2013, which claims priority from U.S. Provisional Patent Application No. 61/662,003 filed Jun. 20, 2012, entitled "IMPROVED RESID HYDROTREATING CATALYST CONTAINING TITANIA", all of which are hereby incorporated by reference.

FIELD OF THE INVENTION

The present invention relates to the catalytic hydrotreating of residuum feed streams. In particular, the present invention relates to a method for the preparation of an improved catalyst carrier, an improved hydrodesulfurization catalyst prepared using the carrier and a process for hydrodesulfurizing a hydrocarbon feedstock while simultaneously reducing the microcarbon residue content of the treated feedstock using the aforementioned catalyst.

BACKGROUND OF THE INVENTION

Hydrocarbon feedstocks are typically combusted as a fuel. When these hydrocarbon feedstocks contain sulfur, the combustion of the feedstocks produces a pollutant of the atmosphere in the form of sulfur oxide gases. In the petroleum refining industry, it is often desirable to upgrade sulfur containing oil and fractions like heavy oils and residuum by hydrotreating to reduce the sulfur content of the fractions.

In the hydrotreating process, hydrocarbon feedstocks are contacted with a hydroconversion catalyst in the presence of hydrogen at elevated pressure and temperature. Catalysts used in hydrotreating processes generally comprise catalytically active metals from Groups 6, 9 and 10 of The Periodic Table and are typically supported on a support made predominately of alumina. To achieve desulfurization, typical operating conditions hydrotreating processes have included a reaction zone temperature of 300° C. to 480° C. a pressure of 20 to 200 bar, a hydrogen feed rate of 90 to 2500 normal liters of hydrogen gas per liter (Nl/l) of oil feed, and a catalyst such as nickel or cobalt and molybdenum or tungsten on a predominately alumina support.

In addition to upgrading the heavy oil or residuum stock to reduce sulfur, it is highly desirable to upgrade the hydrocarbon feedstocks to provide a low carbon residue.

Carbon residue is a measurement of the tendency of a hydrocarbon to form coke. Expressed in weight percent, carbon residue may be measured as microcarbon residue (MCR). The MCR content in a hydrotreated residual feedstock is an important parameter since the hydrotreated residue usually acts as feed to a coker or the fluid catalytic cracking (FCC) unit. Decreasing the MCR content in a hydrotreated residue decreases the amount of low value coke generated in the coker and increases the amount of gasoline generated in the FCC unit.

To this end, there remains a need to develop catalyst compositions which provide good hydrodesulfurization of heavy oil and residuum feedstocks while simultaneously providing improved MCR conversion during a hydrotreating process.

SUMMARY OF THE INVENTION

The present invention is based on the finding that the use of a co-precipitated titania alumina support having a specified pore distribution unexpectedly provides an improved catalyst for hydrodesulfurization of hydrocarbon feedstocks, in particularly residuum feedstocks, during a hydrotreating process as compared to hydrodesulfurization using catalysts prepared from an alumina support having the same or substantially the same pore distribution.

Additionally, catalysts of the invention provide a reduced MCR content in residue fractions. Hydrocarbon fractions obtained from a hydrotreating process using a catalyst in accordance with the invention advantageously exhibit a reduced MCR content as compared to the MCR content of the starting hydrocarbon feedstock. Further, hydrocarbon fractions obtained from a hydrotreating process using a catalyst in accordance with the invention unexpectedly exhibit a reduced MCR content when compared the MCR content obtained using a hydrodesulfurization catalyst having the same or substantially the same pore distribution and prepared from a support containing alumina alone.

In one aspect of the present invention, a catalyst support for preparing an improved hydrodesuflurization catalyst is provided. The catalyst support comprises a co-precipitated titania alumina having 5 wt % or less titania, based on the total weight of the titania alumina, and has a pore distribution such that at least 70 volume percent of its pore volume is in pores having a diameter between about 70 Å and about 130 Å, less than 5% of the pore volume is in pores having a diameter above 300 Å, and less than 2% of the pore volume is in pores having a diameter above 1000 Å.

In another aspect of the present invention, a process is provided for preparing an improved hydrodesulfurization catalyst. The catalyst is prepared from a catalyst support material comprising a co-precipitated titania alumina having 5 wt % or less titania, based on the total weight of the titania alumina. Catalysts in accordance with the present invention are prepared by impregnating catalytically active Group 6, 9 and 10 metals or precursor metal compounds, and optionally, phosphorous compounds, on a support in accordance with the invention.

In another aspect of the present invention there are provided improved hydrodesulfurization catalysts for reducing the content of sulfur in a residuum hydrocarbon feed stock during a hydrotreating process.

In still another aspect of the present invention there are provided improved hydrotreating catalysts which have the ability to reduce the content of sulfur in a residuum hydrocarbon feed stock during a hydrotreating process while simultaneously reducing the content of microcarbon residue (MCR) in the hydrotreated hydrocarbon fraction.

The present invention also provides a method of making a co-precipitated titania alumina support having a distinctive pore size distribution.

In yet another aspect of the present invention improved hydrotreating processes using supported catalyst compositions in accordance with the present invention are provided.

These and other aspects of the present invention are described in further details below.

DETAILED DESCRIPTION OF THE INVENTION

The present invention generally provides catalyst compositions comprised of catalytically active metals or precursor metal compounds of metals of Groups 6, 9 and 10 of The Periodic Table, and optionally phosphorous compounds, supported on a co-precipitated titania alumina support. In one embodiment of the invention, the support material used to prepare the catalyst of the invention comprises titania alumina containing 5 wt % or less titania, based on the total weight of the titania alumina composition. In another embodiment of the invention, the support material comprises less than 5 wt % titania, based on the total weight of the titania alumina composition. In still another embodiment of the invention the support material comprises from about 0.3 to about 4.5 wt % titania, based on the total weight of the titania alumina composition.

Titania alumina supports in accordance with the present invention generally comprise at least 90 wt % of a co-precipitated titania alumina as described herein. Preferably, the support material comprises at least 95 wt %, most preferably, greater than 99 wt % of titania alumina, said weight percent being based on the total weight percent of the support. The support material thus can "consist essentially of" the co-precipitated titania alumina as described herein. The phrase "consist essentially of" as used herein with regards to the composition of the support material is used herein to indicate that the support material may contain co-precipitated titania alumina and other components, provided that such other components do not materially affect or influence the catalytic properties of the final hydroconversion catalyst composition.

Advantageously, titania alumina supports in accordance with the present invention possess specific properties of surface area, pore volume and pore volume distribution.

For purposes of the present invention, pore volume may be measured using nitrogen porosimetry and mercury penetration porosimetry. Typically, pores having a diameter of 1000 Å or less are measured using nitrogen porosimetry while pores having a diameter of greater than 1000 Å are measured using mercury penetration porosimetry.

Pore volume as described herein is the volume of a liquid which is adsorbed into the pore structure of the sample at saturation vapor pressure, assuming that the adsorbed liquid has the same density as the bulk density of the liquid. The liquid used for nitrogen porosimetry is liquid nitrogen. The procedure for measuring pore volumes by nitrogen physisorption is as disclosed and described in D. H. Everett and F. S. Stone, *Proceedings of the Tenth Symposium of the Colstom Research Society*, Bristol, England: Academic Press, March 1958, pp. 109-110.

The mercury measurement of the pore volume and the pore size distribution of the alumina support material recited in the present invention may be obtained using any suitable mercury porosimeter capable of a pressure range of atmospheric pressure to about 4000 bar, with a contact angle, $\theta=140°$, and a mercury surface tension of 0.49 N/m at room temperature.

Surface area as defined herein is determined by BET surface area analysis. The BET method of measuring surface area has been described in detail by Brunauer, Emmett and Teller in *J. Am. Chem. Soc.* 60 (1938) 309-319, which is incorporated herein by reference.

The surface area of titania alumina supports of the invention ranges from about 180 m$^2$/g to about 300 m$^2$/g. In a preferred embodiment of the invention, the surface area of the titania alumina supports ranges from about 220 m$^2$/g to about 280 m$^2$/g.

Titania alumina supports of the invention have a total pore volume in the range from about 0.5 cc/g to about 1.1 cc/g. In a preferred embodiment of the invention, the total pore volume of the supports ranges from about 0.6 cc/g to about 0.8 cc/g.

Supports of the invention have a distinct pore volume distribution such that generally at least 70% of the total pore volume have pores in a diameter between about 70 Å to 130 Å, less than 5% of the total pore volume have pores in a diameter above 300 Å, as determined by nitrogen porosimetry, and less than 2% of the total pore volume having pores with a diameter above 1000 Å, as determined by mercury penetration porosimetry.

In one embodiment of the invention, at least 79% of the total pore volume of the co-precipitated titania alumina support have pores in a diameter between about 70 Å to 130 Å.

In another embodiment of the invention, from about 0.4 to about 1.5% of the total pore volume of the co-precipitated titania alumina support have pores in a diameter above 1000 Å.

Titania alumina supports in accordance with the present invention are prepared by co-precipitating aqueous alumina sulfate and an amount of titanyl sulfate sufficient to provide 5 wt % or less titania in a co-precipitated titania alumina powder. In accordance with this embodiment, alumina sulfate and titanyl sulfate are mixed with an aqueous stream containing sodium aluminate and held at a pH of about 7.5 to about 10.0 and a temperature of about 50° C. to about 80° C. to precipitate a titania alumina powder. The precipitated powder is filtered, washed with water and dried at a temperature ranging from about 150° C. to about 250° C. until a powder with a moisture content of 20 wt % to 40 wt %, as analyzed by a moisture analyzer at 955° C., is achieved.

The dried titania alumina powder is thereafter treated with a peptizing agent to peptize the alumina powder. Suitable peptizing agents include but are not limited to, strong monobasic acids (e.g. nitric acid, hydrochloric acid and the like); organic acids (e.g. formic acid, acetic acid, propionic acid and the like); and aqueous bases (e.g. ammonium hydroxide and the like). The peptized alumina powder is then extruded and dried at a temperature ranging from about 100° C. to about 150° C. for about 30 minutes to about 3 hours.

The dried extrudate is thereafter calcined at a temperature ranging from about 500° C. to 900° C. for about 1 hour to about 3 hour to obtain a final support having the required pore structure. Preferably, the dried extrudate is calcined at a temperature ranging from about 650° C. to about 870° C. for about 1 to about 2 hours to obtain the final support.

Extruded supports in accordance with the invention may have various geometric forms, such as cylinders, rings, and symmetric and/or asymmetric polylobes, for instance, tri- or quadrulobes. Nominal sizes of the extrudates may vary. The diameter usually ranges from about 1 mm to about 3 mm, and the length ranges from about 1 mm to about 30 mm. In one embodiment of the invention, the diameter ranges from about 1.1 mm to about 1.2 mm and the length ranges from about 2 mm to about 6 mm. As will be understood by one skilled in the catalyst arts, catalyst particles produced from the supports will have a similar size and shape as the support.

Catalysts in accordance with the invention are prepared by contacting the titania alumina supports with an aqueous solution of at least one catalytically active metal or precursor metal compound to uniformly distribute the desired metal on the support. Preferably, the metals and/or metal precursors are distributed uniformly throughout the pores of the support. In a preferred embodiment of the invention, the catalysts are prepared by impregnation of the catalyst supports to incipient wetness with an aqueous solution of the desired catalytically active metal or precursor compound.

Catalytically active metal and/or precursor metals compounds useful to prepare the catalyst composition of the invention, include, but are not limited to metals or compounds of metals selected from the group consisting of Group 6 of The Periodic Table, Group 9 of The Periodic Table, Group 10 of The Periodic Table and combinations thereof. Preferred Group 6 metals include, but are not limited to, molybdenum and tungsten. Preferred Groups 9 and 10 metals include, but are not limited to, cobalt and nickel.

In a preferred embodiment of the invention the combinations of nickel and molybdenum catalytic agents are preferred. In a more preferred embodiment of the invention, the resulting catalyst comprises Mo concentrations in the range of about 5.0 to about 12.0 wt % and Ni concentrations in the range of about 1.0 to about 6.0 wt %, said wt % being based on the total weight of the catalyst composition.

Suitable precursor metal compounds of Groups 9 and 10 metals include, but are not limited to, metallic salts such as nitrates, acetates and the like. Suitable precursor metal compounds of Group 6 metals include, but are not limited to, ammonium molybdate, molybdic acid, molybdenum trioxide, and the like.

Catalytically active metals contemplated for use with the supports of the present invention are preferably used in the form of oxides and/or sulfides of the metals. Preferably, the catalytically active metals are used in the form of oxides.

Catalyst compositions of the invention may also comprise a phosphorus component. In this case, the impregnating solution may also contain a phosphorus compound, e.g. phosphoric acid, phosphates, and the like, in addition to the desired catalytically active metals or precursor metal compounds. Concentrations in the range of up to about 3.5 wt % of phosphorous, calculated as elemental phosphorous, based on the weight of the total catalyst composition, are suitable for use in the catalysts of the invention. In a preferred embodiment of the invention, phosphorous concentrations in the range of about 0.3 to about 3.0 wt % of phosphorous, calculated as elemental phosphorous, based on the weight of the total catalyst composition, are useful in the catalysts of the invention.

Following treatment of the supports with aqueous solutions of the catalytically active metal/s or precursor compound/s, the catalyst are optionally dried at a temperature in the range of about 100° C. to about 200° C. for about 30 minutes to about 2 hours. The dried catalyst is thereafter calcined at a temperature and for a time sufficient to convert at least part, preferably all, of the metal components or precursors to the oxide form. In one embodiment of the invention, the catalyst is calcined at a temperature in the range of about 300° C. to about 600° C. for about 30 minutes to about 3 hours. In a preferred embodiment of the invention, the catalyst is calcined at a temperature ranging from about 450° C. to about 550° C. for about 1 hour to about 2 hours.

As will be clear to a person skilled in the art, there is a wide range of variations on the impregnating method used to support the catalytic active metals on the catalyst supports. It is possible to apply a plurality of impregnating steps or the impregnating solutions may contain one or more of the component or precursors to be deposited, or a portion thereof. Instead of impregnating techniques, dipping methods, spraying methods and the like can be used. In the case of multiple impregnations, dipping, and the like, drying and/or calcining may be carried out as between steps.

Catalysts according to the invention exhibit an increased catalytic activity and stability for hydrodesulfurization of residuum feedstock during a hydrotreating process. The catalytic process of the present invention is basically directed to residuum feedstocks as opposed to gas-oil feedstocks. Residua typically have greater than 10 ppm metals, whereas gas-oils nearly always have less than 10 ppm metals content. Thus, typical feedstocks useful in the present invention are "heavy oils" which include, but is not limited to, crude oil atmospheric distillation column bottoms (reduced crude oil or atmospheric column residuum), or vacuum distillation column bottoms (vacuum residua). The metals are believed to be present as organometallic compounds, possibly in porphyrin or chelate-type structures, but the concentrations of metals referred to herein is calculated as parts per million pure metal.

Catalysts of the invention provide an increased micro carbon residue (MCR) conversion during a hydrotreating process under hydrodesulfurization conditions. Consequently, the hydrodesulfurized hydrocarbon fraction obtained exhibits a reduced MCR content as compared to the MCR content of the starting residuum feedstock. Further, hydrotreated hydrocarbon fractions obtained using the catalyst of the invention unexpectedly exhibit a reduced MCR as compared to the MCR obtainable using hydrodesulfurization catalysts prepared from a support containing alumina alone or alumina in combination with other refractory inorganic materials such as silica and magnesia.

A hydrotreating process employing the catalyst compositions of this invention may be carried out under hydrodesulfurization process conditions in an apparatus whereby an intimate contact of the catalyst composition with said residuum containing feedstock and a free hydrogen containing gas is achieved, to produce a hydrocarbon-containing fraction having a reduced level of sulfur. In a preferred embodiment of the invention, the hydrotreating process is carried out using a fixed catalyst bed. The hydrotreating process can be carried out as a batch process or a continuous process using one or more fixed catalyst beds or a plurality of fixed bed reactors in parallel or in series.

Typical hydrodesulfurization process conditions useful in the invention include, but are not limited to, temperatures between about 300° and about 450° C., hydrogen pressures between about 120 and about 200 bar, $H_2$:oil (or residuum hydrocarbon feedstock) ratios between about 250 and about 1400 Nl/l (normal liters of hydrogen gas per liter of oil feed), and space velocities ($hr^{-1}$) between about 0.2 and about 2.0. In one embodiment of the invention, the operating conditions for a hydrocarbon feedstock desulfurization process include a reaction zone temperature of about 371° C. to about 388° C., a hydrogen pressure of about 138 to about 158 bar, and a hydrogen feed rate of about 880 to about 900 normal liters per liter of oil feed.

To further illustrate the present invention and the advantages thereof, the following specific examples are given. The examples are given as specific illustrations of the claimed invention. It should be understood, however, that the invention is not intended to be limited to the specific details set forth in the Examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. Unless otherwise specified or inconsistent with the disclosure, all ranges recited herein include the endpoints, including those that recite a range "between" two values.

EXAMPLES

Example 1

Aluminum sulfate solution, titanyl sulfate solution and water were mixed to form 50 gallons of solution containing 3.4% aluminum and 0.45% titanium. This aluminum and titanyl sulfate solution was added to a strike tank containing a heel of 165 gallons of water at 63° C. Simultaneously, an aqueous sodium aluminate solution containing 12% aluminum was added to the strike tank to maintain the slurry pH at 8.4. After all the aluminum and titanyl sulfate solution was added, the sodium aluminate solution flow continued to bring the pH of the slurry to 9.2.

The slurry was filtered to separate out the titania alumina mix, which was subsequently washed on the filter belt to remove residual sodium and sulfate. The resulting filter cake was then spray dried to obtain a titania alumina powder containing 3.5 g titania per 100 g of titania alumina.

Example 2

The titania alumina obtained in Example 1 (5000 g) was mixed with 52 g of concentrated nitric acid (70%) and 5107 g of water for 85 min into a wet mix. This wet mix was then extruded using a four-inch extruder into asymmetrical quadrilobe shaped extrudates (nominal diameter 0.05"). The extrudates were dried overnight at 120° C. before being calcined at 650° C. for 1 hr in 8 liter per minute of air flow.

The calcined extrudates had the following properties: surface area 263 $m^2/g$; total pore volume 0.714 cc/g; the pore volume in pores having a diameter between 70 and 130 Å was 79% of total pore volume; the pore volume in pores having a diameter above 300 Å was 1.2% of total pore volume; and the pore volume in pores having a diameter above 1000 Å was 0.52% of total pore volume. The calcined titania alumina support contained 3.5 wt % titania.

Example 3

A titania alumina catalyst support prepared as described in Example 2 was impregnated with an aqueous metal solution containing 11.4% Mo, 3.1% Ni and 0.3% P. The aqueous solution was prepared using molybdenum trioxide, nickel carbonate and phosphoric acid in water. The wet extrudates were transferred into muffle trays and covered with perforated aluminum foil. The muffle trays were placed in an oven at 120° C. overnight.

The dried extrudates were then calcined at 538° C. for 30 min in 8 liter per minute of air flow. The finished catalyst was designated Catalyst A and contained 9.60% molybdenum, 2.52% nickel, 1.75% titanium, and 0.26% phosphorous. Properties of the catalyst were as described in Table 1 below.

Example 4

A titania alumina catalyst support prepared as described in Example 2 was impregnated with an aqueous metal solution containing 11.8% Mo, 3.2% Ni and 2.6% P. The solution was prepared from molybdenum trioxide, nickel carbonate and phosphoric acid. The wet extrudates were transferred into muffle trays and covered with perforated aluminum foil. The muffle trays were placed in an oven at 120° C. overnight.

The dried extrudates were then calcined at 538° C. for 30 min in 8 liter per minute of air flow. The finished catalyst was designated Catalyst B and contained 9.52% molybdenum, 2.49% nickel, 1.78% titanium, and 1.95% phosphorous. Properties of the catalyst were as described in Table 1 below.

Example 5

A titania alumina powder was prepared as described in Example 1 with the exception that the strike tank contained a heel of 234 gallons of water. The final titania alumina powder contained 4.1 g titania per 100 g of titania alumina. A titania alumina support was prepared as described in Example 2 except that 5000 g of the powder was mixed with 136 g of concentrated nitric acid and 5275 g of water for only 60 min before extrusion, drying and calcination.

The calcined extrudates had the following properties: surface area 267 $m^2/g$; total pore volume 0.674 cc/g; the pore volume in pores having a diameter between 70 and 130 Å was 71% of total pore volume; the pore volume in pores having a diameter above 300 Å was 1.78% of total pore volume; and the pore volume in pore having a diameter above 1000 Å was 0.73% of total pore volume.

The titania alumina catalyst support was impregnated with an aqueous metal solution containing 11.4% Mo, 3.1% Ni and 0.3% P and subsequently calcined at 510° C. for 1 h. The finished catalyst was designated as Catalyst C and contained 8.74% molybdenum, 2.20% nickel, 0.29% phosphorous and 1.99% titanium. Properties of the catalyst were as described in Table 1 below.

TABLE 1

| | Properties of Support used in Catalysts | | |
|---|---|---|---|
| | Catalyst A | Catalyst B | Catalyst C |
| | Titania Content, wt % | | |
| PSD, vol % | 3.5 | 3.5 | 4.1 |
| 70-130 Å | 79% | 79% | 71% |
| >300 Å | 1.20 | 1.20 | 1.78 |
| 50-200 Å | 93.0 | 93.0 | 89.7 |
| >1,000 Å | 0.52 | 0.52 | 0.73 |

Comparative Example 1

An alumina powder was precipitated as described in Example 1 except that the aluminum sulfate solution was mixed with only water and not titanyl sulfate. The resulted alumina powder contained no detectable amount of titania.

A portion of the alumina powder (5000 g) was mixed with 134 g of concentrated nitric acid and 4961 g of water for 60 min into a wet mix. The wet mix was then extruded using a four-inch extruder into asymmetrical quadrilobe shaped extrudates (nominal diameter 0.05"). The extrudates were dried overnight at 120° C. before being calcined at 650° C. for 1 hr in 8 liter per minute of air flow.

The calcined extrudates had the following properties: surface area 276 $m^2/g$; total pore volume 0.746 cc/g; the pore volume in pores having a diameter between 70 and 130 Å was 78% of total pore volume; the pore volume in pores having a diameter above 300 Å was 1.10% of total pore volume; and the pore volume in pores having a diameter above 1000 Å was 0.96% of total pore volume, See Table 2 below.

The calcined extrudates were impregnated with an aqueous metal solution prepared from molybdenum trioxide, nickel carbonate and phosphoric acid to obtain a finished catalyst designative Comparative Catalyst 1 which contained 8.49% molybdenum, 2.37% nickel, and 0.22% phosphorous with a less than detectable titanium content.

Comparative Example 2

750 g of a precipitated alumina powder prepared as described in Comparative Example 1 above was mixed with 8.9 g of concentrated nitric acid, 51.3 g magnesium nitrate hexahydrate and 630 g of water for 20 min into a wet mix. The wet mix was then extruded using a two-inch extruder into asymmetrical quadrilobe shaped extrudates (nominal diameter 0.05"). The extrudates were dried at 204° C. for two hours before being calcined at 650° C. for 1 hr in 0.5 liter per minute of air flow to decompose magnesium nitrate into magnesia.

The calcined extrudates had the following properties: surface area 284 m²/g; total pore volume 0.82 cc/g; the pore volume in pores having a diameter between 70 and 130 Å was 71% of total pore volume; the pore volume in pores having a diameter above 300 Å was 3.17% of total pore volume; and the pore volume in pores having a diameter above 1000 Å was 0.35% of total pore volume. The calcined extrudate contained 1.6 wt % magnesia.

The calcined extrudates were impregnated with an aqueous metal solution prepared from molybdenum trioxide, nickel carbonate and phosphoric acid to obtain a finished catalyst designated Comparative Catalyst 2 which contained 8.96% molybdenum and 2.40% nickel, 0.83% P and 0.85% magnesium. Properties of the catalyst were as described in Table 2 below.

Comparative Example 3

5000 g of a precipitated alumina powder prepared as described in Comparative Example 1 above was mixed with 105 g of concentrated nitric acid, 114 g of fine titania particles, and 3835 g of water for 70 min into a wet mix. The wet mix was extruded using a four-inch extruder into asymmetrical quadrilobe shaped extrudates. The extrudates were dried overnight at 120° C. before being calcined at 650° C. for 1 hr in 8 liter per minute of air flow. The calcined extrudates had the following properties: surface area 263 m²/g; total pore volume 0.720 cc/g; the pore volume in pores having a diameter between 70 and 130 Å was 79% of total pore volume; the pore volume in pores having a diameter above 300 Å was 1.0% of total pore volume; and the pore volume in pores having a diameter above 1000 Å was 0.22% of total pore volume. The percentage pore volume in pores between 50 and 200 Å, and above 200 Å was 93.0, and 1.85%, respectively. The calcined extrudates contained 3.5% titania through comulling.

The calcined extrudates were impregnated and calcined at a temperature of 350° C. to provide a finished catalyst. The catalyst was designated as Comparative Catalyst 3 and contained 8.78% molybdenum and 2.46% nickel, 1.63% titanium and 0.22% phosphorous. Properties of the catalyst were as described in Table 2 below.

Comparative Example 4

Titania alumina powder (1521 g) precipitated as described in Example 1 with the exception that the heel water in strike tank was at 57° C. and containing 3.6 g titania per 100 g of titania and alumina. The titania alumina powder was mixed with 15.2 g of concentrated nitric acid and 1166 g of water for 5 min into a wet mix. This wet mix is then extruded using a four-inch extruder into asymmetrical quadrilobe shaped extrudates (nominal diameter 0.05"). The extrudates were dried overnight at 120° C. before being calcined at 704° C. for 1 hr. The calcined extrudates had the following properties: surface area 280 m²/g; total pore volume 0.963 cc/g; the pore volume in pores having a diameter between 70 and 130 Å was 62.7% of total pore volume; the pore volume in pores having a diameter above 300 Å was 16.1% of total pore volume; and the pore volume in pores having a diameter above 1000 Å was 12.3% of total pore volume. The percentage pore volume in pores less than 50 Å, between 50 and 200 Å, and above 200 Å were 2.1%, 80.7%, and 17.2%, respectively.

An impregnation solution was prepared from 9.8 g of ammonium heptamolybdate, 7.5 g of nickel nitrate hexahydrate, 18 g of concentrated ammonia solution (29%) and 10 mL water. 52 g of the impregnation solution was sprayed onto the above base. The impregnated base was subsequently calcined at 510° C. for 1 hour to provide the finished catalyst. The catalyst was designated as Comparative Catalyst 4 and contained 9.04% molybdenum, 2.36% nickel, 1.88% titanium, with less than a detectable phosphorous content. Properties of the catalyst were as described in Table 2 below.

TABLE 2

Properties of Support in Comparative Catalysts

|  | Comparative Catalyst 1 | Comparative Catalyst 2 | Comparative Catalyst 3 | Comparative Catalyst 4 |
|---|---|---|---|---|
|  | Titania Content, wt % | | | |
| PSD, vol % | 0.00 | 0.00 | 3.5 | 3.6 |
| 70-130 Å | 78 | 71 | 79 | 62.7 |
| >300 Å | 1.10 | 3.17 | 1.00 | 16.1 |
| 50-200 Å | 92.8 | 90.9 | 93 | 80.7 |
| >1,000 Å | 0.96 | 0.22 | 0.22 | 12.3 |

Example 6

Catalysts of the invention were evaluated for hydrodesulfurization and MCR residue content. After being presulfided using dimethyl disulfide, Catalyst A, Catalyst B, Catalyst C and Comparative Catalyst 1, Catalyst 2, Catalyst 3, and Catalyst 4 were contacted with Arabian Light residuum feed, which feed had been passed through a standard commercial demetallation catalyst in a continuous packed bed reactor. The overall LHSV and pressure used in processing the Arabian Light residuum through the catalyst system containing the demetallation catalyst and the respective demetallation catalyst was 0.35 h⁻¹ and 2167 psig. The temperature of the reactor containing the demetallation catalyst was increased from 365 to 377° C., the temperature of the reactor containing Catalysts A through C and Comparative Catalysts 1 through 4 was increased from 371 to 388° C. throughout the test. The properties of the Arabian light residuum are shown in Table 3 below.

TABLE 3

Properties of feed used in Example 6

| Micro Carbon Residue | 9.87 | wt % |
|---|---|---|
| API Gravity | 5.7 |  |
| Sulfur | 0.29 | wt % |
| Hot Heptane Asphaltenes | 0.94 | wt % |
| Nickel | 0.9 | ppm |
| Vanadium | 0.9 | ppm |
| 5 vol % TBP | 15 | F. |
| 95 vol % TBP | 305 | F. |

After the catalysts had been in service for 400 h and reached 388° C., the results for sulfur and hydrotreated residue MCR content were recorded in Table 4 below.

TABLE 4

MCR and Sulfur Level Results for Test Catalyst Samples

| CATALYST | Mo % | Ni % | P % | Ti % | Product MCR % | Product Sulfur % |
|---|---|---|---|---|---|---|
| Catalyst A | 9.60 | 2.52 | 0.26 | 1.75 | 3.27 | 0.22 |
| Catalyst B | 9.52 | 2.49 | 1.95 | 1.78 | 3.34 | 0.19 |
| Catalyst C | 8.74 | 2.20 | 0.29 | 1.99 | 3.45 | 0.24 |
| Comparative Catalyst 1 | 8.49 | 2.37 | 0.22 | — | 3.69 | 0.26 |
| Comparative Catalyst 2 | 8.96 | 2.40 | 0.83 | — | 3.71 | 0.28 |
| Comparative Catalyst 3 | 8.78 | 2.46 | 0.22 | 1.63 | 3.97 | 0.43 |
| Comparative Catalyst 4 | 9.04 | 2.36 | — | 1.88 | 4.28 | 0.43 |

As shown in the Table 4 above, the residuum fraction processed using Catalyst A contained 3.27% MCR and 0.22% sulfur, and the residuum fraction processed using Catalyst B contained 3.34% MCR and 0.19% sulfur. In comparison, the residuum fraction processed using Comparative Catalyst 1 contained 3.69% MCR and 0.26% sulfur. This shows the benefit of incorporating titanium in the support via co precipitation.

The residuum fraction processed using Catalyst C contained 3.45% MCR and 0.24% sulfur. This showed the effect of a decreased pore volume percentage in the range of 70 to 130 Å for Catalyst C as compared to Catalyst A. The residuum fraction processed using Comparative Catalyst 2 and Comparative Catalyst 3 contained 3.71% and 3.97% MCR and 0.28 and 0.43% sulfur, respectively. The results obtained from these two examples showed that the catalyst prepared from a support containing magnesium oxide or titania along with alumina made by co-mulling are less effective to reduce sulfur and MCR as compared to a catalyst prepared from the co-precipitated titania alumina support of the invention.

The residuum fraction processed using Comparative Catalyst 4 contained 4.28% MCR and 0.43% sulfur, which shows that a catalyst prepared from a support having a pore distribution outside of the pore distribution of the invention provides inferior MCR and sulfur reduction.

The invention claimed is:

1. A catalyst support comprising a titania alumina extrudate formed from a peptized co-precipitated titania alumina powder having 5 wt % or less titania based on the total weight of the titania alumina, said support having a total pore volume in the range of from about 0.5 to about 1.0 cubic centimeters per gram, at least 70% of the total pore volume in pores having a diameter between about 70 Å and about 130 Å, less than 5% of the total pore volume have pores in a diameter above 300 Å, as determined by nitrogen porosimetry, and less than 2% of the total pore volume in pores having a diameter above 1000 Å, as determined by mercury penetration porosimetry.

2. The support of claim 1 wherein the amount of titanium present in the titania alumina is an amount less than 5 wt %, based on the total weight of the titania alumina.

3. The support of claim 2 wherein the amount of titania present in the titania alumina is an amount from about 0.3 to about 4.5 wt % titania, based on the total weight of the titania alumina.

4. The support of claim 1 wherein the support comprises at least 90 wt % co-precipitated titania alumina.

5. The support of claim 1 wherein: (a) at least 79% of the total pore volume is in pores having a diameter between about 70 Å and about 130 Å; or (b) from about 0.40% to about 1.5% of the total pore volume is in pores having a diameter above 1000 Å; or both (a) and (b).

6. A method for preparing a catalyst for hydrodesulfurization of residuum hydrocarbon feedstocks which method comprises: impregnating the porous extruded support of claim 1 with an aqueous solution comprising at least one catalytic agent or catalytic agent precursor selected from the group consisting of a compound of Group 6 metals of The Periodic Table, Group 9 metals of the Periodic Table, Group 10 metals of The Periodic Table, and combinations thereof, and optionally phosphorous, said compounds being thermally decomposable to their corresponding metal oxides, and thereafter drying and calcining the resulting impregnated support to provide a supported catalyst.

7. A catalyst produced by the method according to claim 6.

8. A catalyst suitable for use in hydrodesulfurization of residuum hydrocarbon feedstocks comprising:
    (a) a support comprising a titania alumina extrudate formed from a peptized co-precipitated titania alumina powder having 5 wt % or less titania based on the total weight of the titania alumina; and
    (b) at least one catalytic agent comprising a metal selected from the group consisting of a Group 6 metal of The Periodic Table, a Group 9 metal of The Periodic Table, a Group 10 metal of The Periodic Table, and combinations thereof, and optionally phosphorous;
    wherein the support is characterized as having:
    (i) a total pore volume of from about 0.5 to about 1.0 cubic centimeters per gram;
    (ii) at least 70% of the total pore volume in pores having a diameter between about 70 Å and about 130 Å;
    (iii) less than 5% of the total pore volume in pores having a diameter above 300 Å, as determined by nitrogen porosimetry; and
    (iv) less than 2% of the total pore volume in pores having a diameter above 1000 Å, as determined by mercury penetration porosimetry.

9. The catalyst of claim 8 wherein the calcined support comprises at least 90 wt % of the co-precipitated titania alumina.

10. The catalyst of claim 8 wherein the amount of titania present in the co-precipitated titania alumina is an amount less than 5 wt %, based on the total weight of the titania alumina.

11. The catalyst of claim 10 wherein the amount of titania present in the co-precipitated titania alumina is an amount from about 0.3 to about 4.5 wt % titania, based on the total weight of the titania alumina.

12. The catalyst of claim 8 wherein: (a) at least 79% of the total pore volume of the support is in pores having a diameter between about 70 Å and about 130 Å; or (b) from about 0.40% to about 1.5% of the total pore volume is in pores having a diameter above 1000 Å; or both (a) and (b).

13. The catalyst of claim 8 wherein said at least one catalytic agent comprises a metal selected from the group consisting of cobalt, nickel, molybdenum, and combinations thereof, and optionally phosphorous.

14. A process for hydrotreating residuum hydrocarbon feedstocks comprising at least one of sulfur or microcarbon residue (MCR), which process comprises contacting said residuum feedstocks with a catalyst of claim 8 under hydrodesulfurization process conditions and producing a hydrotreated residuum hydrocarbon fraction having a reduced sulfur content or a reduced MCR content or both a reduced sulfur and a reduced MCR content compared to the residuum hydrocarbon feedstock.

15. The process of claim 14 wherein the residuum hydrocarbon feedstock is contacted with the catalyst at a reaction temperature from about 300° C. to about 450° C., a hydrogen pressure of about 120 bar to about 200 bar, a $H_2$:oil ratio ranging from about 250 Nl/l to about 1400 Nl/l, and a space velocity from about 0.2 $hr^{-1}$ to about 2.0 $hr^{-1}$.

* * * * *